United States Patent [19]
McCune, Jr.

[11] Patent Number: 5,321,799
[45] Date of Patent: Jun. 14, 1994

[54] SIGNALLING TRANSITION CONTROL IN A MODULATED-SIGNAL COMMUNICATIONS SYSTEM

[75] Inventor: Earl W. McCune, Jr., Santa Clara, Calif.

[73] Assignee: Proxim, Inc., Mountain View, Calif.

[21] Appl. No.: 870,246

[22] Filed: Apr. 17, 1992

[51] Int. Cl.⁵ .................................... G06F 15/62
[52] U.S. Cl. ............................ 395/140; 395/138; 395/142; 395/143; 395/133
[58] Field of Search ............... 395/133, 134, 138, 139, 395/140–143, 155, 161; 375/53

[56] References Cited

U.S. PATENT DOCUMENTS

| | | | |
|---|---|---|---|
| 4,583,116 | 4/1986 | Hennig et al. | 358/75 |
| 4,583,238 | 4/1986 | Boisseau et al. | 375/53 |
| 4,746,880 | 5/1988 | McCune, Jr. | 332/16 R |
| 4,809,189 | 2/1989 | Batson | 395/140 X |
| 4,812,996 | 3/1989 | Stubbs | 395/140 X |
| 4,931,861 | 6/1990 | Taniguchi | 358/75 |
| 5,029,115 | 7/1991 | Geraci | 395/131 |
| 5,043,711 | 8/1991 | Harrington | 340/728 |
| 5,046,024 | 9/1991 | Smith et al. | 395/140 |
| 5,113,249 | 5/1992 | Yosefi | 358/75 |
| 5,115,402 | 5/1992 | Matsushiro et al. | 395/141 |
| 5,131,058 | 7/1992 | Ting et al. | 382/47 |

FOREIGN PATENT DOCUMENTS 0189238  7/1986  European Pat. Off. ........ H04N 1/46

*Primary Examiner*—Gary V. Harkcom
*Assistant Examiner*—Almis Jankus
*Attorney, Agent, or Firm*—Burns, Doane, Swecker & Mathis

[57] ABSTRACT

A signal transition control system for use in a modulated-signal communication system having a plurality of predefined signal states each representing a digital data symbol, enables a transition from one signal state to a next signal state to be executed in a smooth, bandwidth-efficient manner. The system includes circuitry for receiving a stream of data symbols and storing in succession consecutive pairs of the data symbols, each of the pairs including a last data symbol and a next data symbol, for producing data describing a vector in signal space from the last data symbol to the next data symbol, for storing data representative of a desired shape of a transition from the last data symbol to the next data symbol, means for sequentially stepping through the data representative of the desired shape, and for producing data representing a transition from the last data symbol to the next data symbol, the transition having the desired shape. The system is used to particular advantage in a number-controlled modulated oscillator that generates a signal having a numerically controlled frequency, a numerically controlled phase, a programmable shape, and a numerically controlled amplitude.

7 Claims, 4 Drawing Sheets

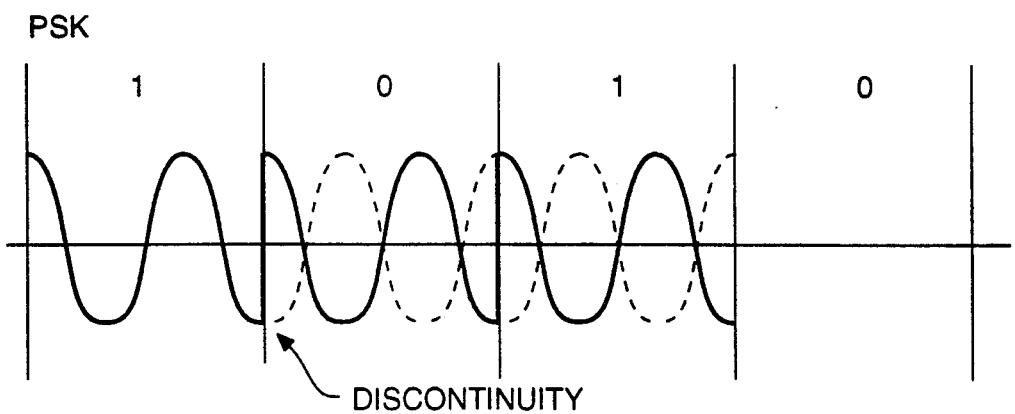
FIG._1A
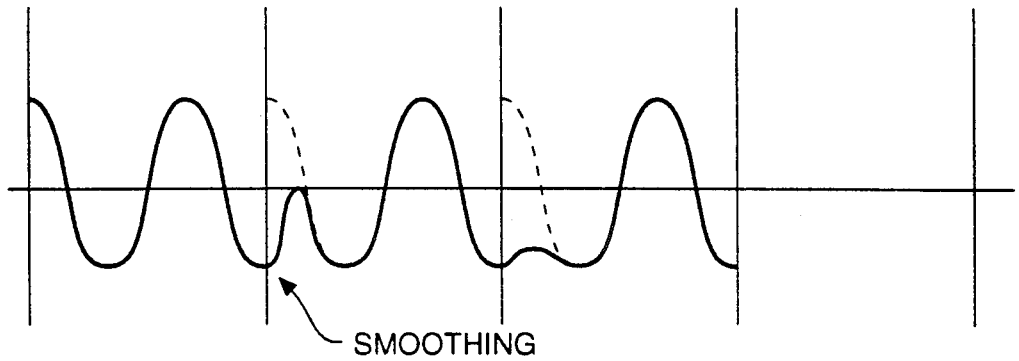
FIG._1B
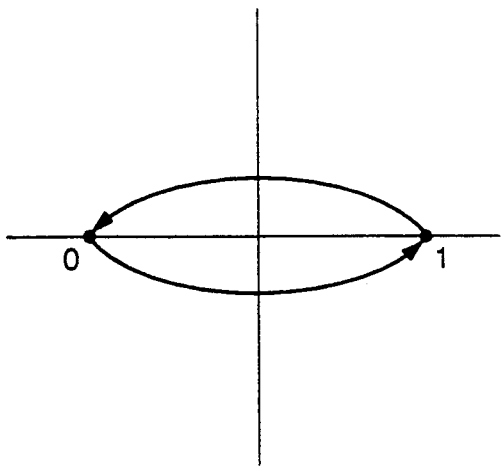
FIG._2A
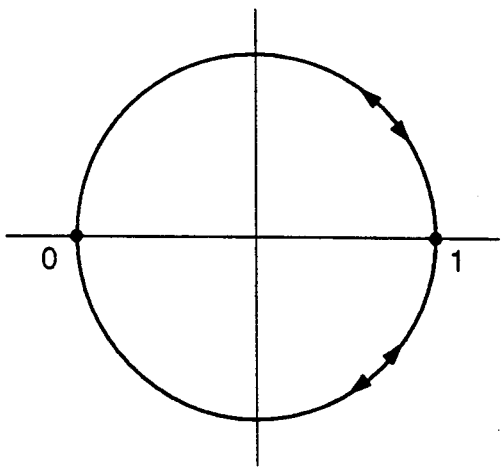
FIG._2B

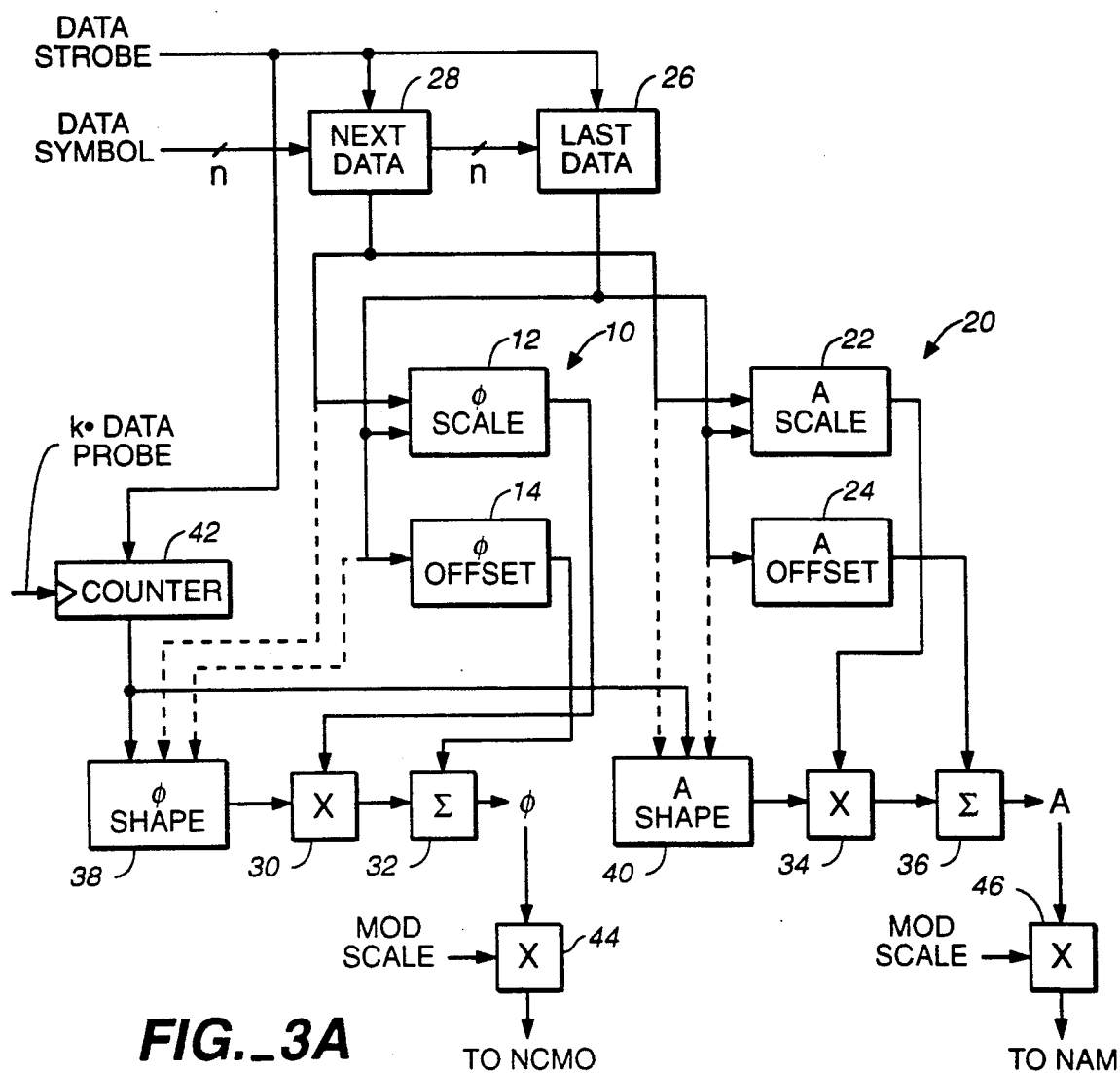
FIG._3A
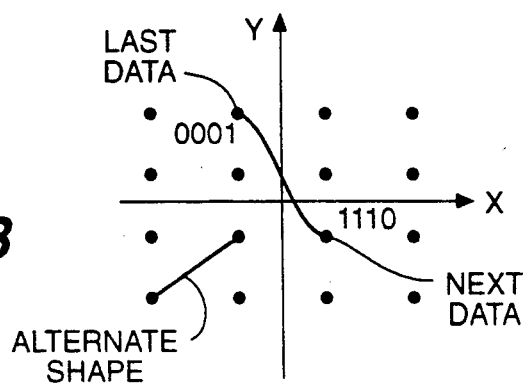
FIG._3B

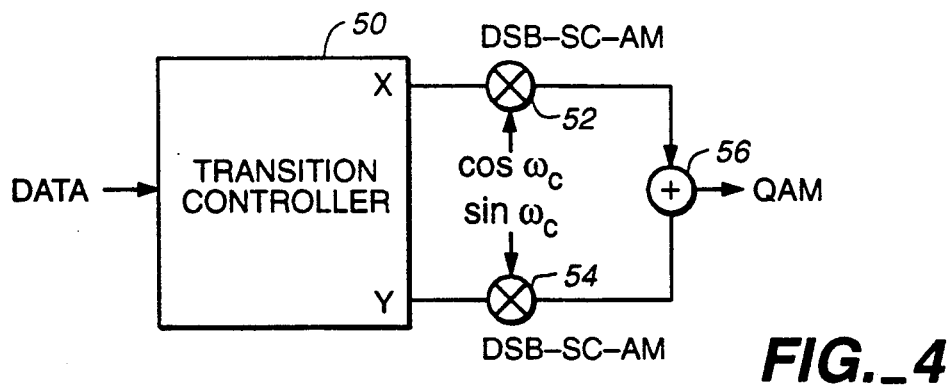
FIG._4
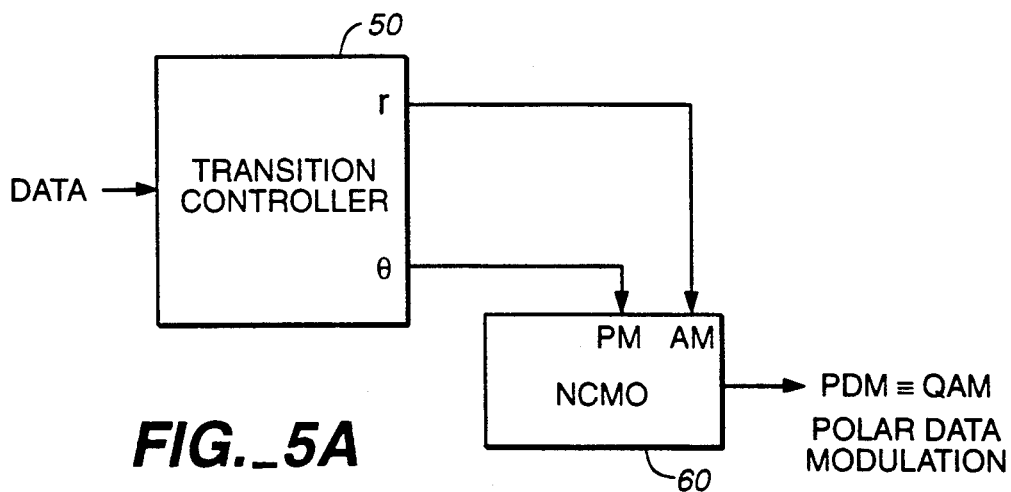
FIG._5A
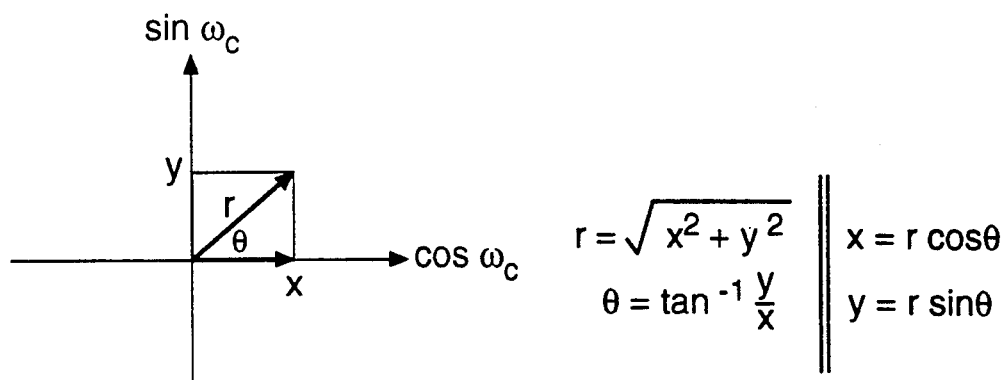
FIG._5B

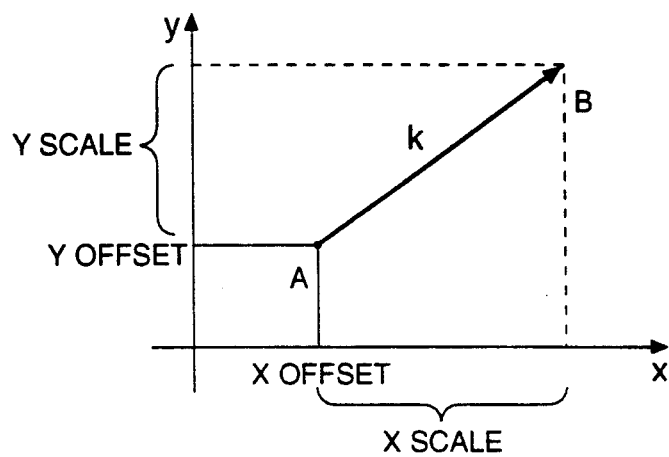
FIG._6
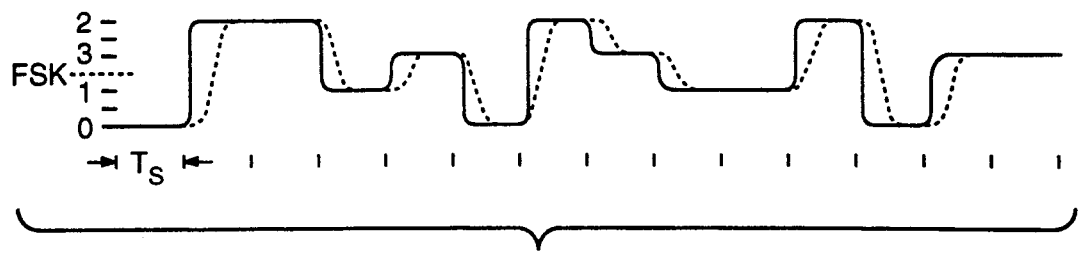
FIG._7A
FIG._7B

SIGNALLING TRANSITION CONTROL IN A MODULATED-SIGNAL COMMUNICATIONS SYSTEM

BACKGROUND OF THE INVENTION

1. Field of the Invention

The present invention relates to modulated-signal communication systems and, more particularly, to signal transition control in such systems.

2. State of the Art

In modulated-signal communications systems, it is well known to impress information on a sinusoidal carrier signal by changing the carrier amplitude, frequency, phase, or combinations thereof. In digital communication systems, the information impressed on the carrier signal is a digital data stream composed of 1s and 0s. One common modulation technique in digital communication systems is phase-shift keying (PSK) in which a phase reversal of the carrier signal of 180° signals a data transition from 1 to 0 or vice versa.

Referring to FIG. 1A, for example, the sequence 1, 0, 1, 0 is to be transmitted using PSK. Each bit has a duration of one and one half cycles of the carrier signal. The initial 1 is therefore represented by one and one half cycles of the carrier signal at a given phase. At the end of the first bit time, a discontinuity occurs as the phase of the carrier signal is reversed to represent the change from a 1 to a 0. Likewise, at the end of the second bit time a discontinuity occurs as the phase of the carrier signal is reversed to represent the change from a 0 to a 1, and so forth.

As is well-known from Fourier analysis, abrupt transitions such as occur between bits in FIG. 1A are inherently wide-bandwidth. In radio communications, radio energy transmitted in connection with a particular signal must be confined within a particular channel bandwidth. Furthermore, the portion of the radio spectrum allocated to any particular use is limited by F.C.C. regulations, within the United States. Therefore, within a limited portion of the radio spectrum, individual channels must be defined so as to have a relatively wide bandwidth if signals of the type shown in FIG. 1A are to be accommodated. As a result, fewer channels can be defined within the limited portion of spectrum than might otherwise be possible and thus less information can be carried.

As described with respect to FIG. 1A, discontinuities can occur in a digitally modulated signal upon transition from one signal state to another. This situation is represented in FIG. 2A, which shows a 2-dimensional signal space. Transitions between the two signal states 0 and 1 occur as "snap transitions", the intervening signal space between the two signal states being traversed almost instantaneously.

SUMMARY OF THE INVENTION

The present invention, generally speaking, provides a signal transition control system for use in a modulated-signal communication system of the type that has a plurality of predefined signal states each representing a digital data symbol. In operation, the system enables a transition from one signal state to a next signal state to be executed in a smooth, bandwidth-efficient manner. The system includes means for receiving a stream of data symbols and storing in succession consecutive pairs of the data symbols, each of the pairs including a last data symbol and a next data symbol, means for producing data describing a vector and signal space from the last data symbol to the next data symbol, means for storing data representative of a desired shape of a transition from the last data symbol to the next data symbol, means for sequentially stepping through the data representative of the desired shape, and means for producing data representing a transition from the last data symbol to the next data symbol, the transition having the desired shape.

Thus, the system of the present invention eliminates discontinuities of the type shown in FIG. 1A in a digital communication signal and, therefore, narrows the bandwidth of the signal such that channels can be spaced more closely within the radio spectrum and more information can be carried. In operation of the present invention, as shown in FIG. 2B, abrupt transitions are smoothed, resulting in a more narrow bandwidth signal. Thus, instead of snap transitions between the two signal states, a controlled trajectory is executed that more gradually traverses the intervening signal space between the two signal states.

In addition, the system of the present invention allows transition shapes to be arbitrarily definable, not restricted to shapes available from passive element (RL-C) filters. The invention is universal in its application to multi-dimensional signals and is equally useful in the case of one-dimensional signals (e.g., FSK, etc.), two-dimensional signals (e.g., QAM, PSK, etc.) and higher-dimension signals.

The present invention can be used in conjunction with a numerically controlled modulated oscillator of the type described in U.S. Pat. No. 4,746,880, incorporated herein by reference. The number controlled modulated oscillator generates a signal having a numerically controlled frequency, a numerically controlled phase, a programmable shape, and a numerically controlled amplitude.

BRIEF DESCRIPTION OF THE DRAWINGS

The present invention can be further understood with reference to the following description in conjunction with the appended drawings, wherein like elements are provided with the same reference numerals. In the drawings:

FIG. 1A is a signal diagram illustrating signal discontinuities produced in the prior art;

FIG. 1B is a signal diagram showing replacement of the discontinuities in FIG. 1A with smooth transitions in accordance with the present invention;

FIG. 2A is a polar representation of a binary signalling system in which snap transitions occur between the signal states;

FIG. 2B is a polar representation of a binary signalling system in which a controlled trajectory is described in transitioning from one signal state to the other;

FIG. 3A is a block diagram of the signal transition control system of the present invention;

FIG. 3B is a 16-point signal state constellation illustrating possible shapes of transitions between successive signal states;

FIG. 4 is a block diagram showing use of the transition controller of the present invention in conventional QAM modulation;

FIG. 5A is a block diagram showing application of the transition controller of the present invention in Polar Data Modulation (PDM), functionally equivalent to QAM;

FIG. 5B is a signal space diagram illustrating the relationship between PDM and QAM;

FIG. 6 is a signal space diagram illustrating the concepts of offset and scale as applied according to the present invention;

FIG. 7A is an illustration of a digital data stream composed of 2-bit data symbols; and FIG. 7B is a signal diagram showing how the data stream of FIG. 7A would be represented in accordance with the present invention (dashed line) as compared to the prior art (solid line).

DETAILED DESCRIPTION OF THE PREFERRED EMBODIMENTS

Referring now to FIG. 3A, a system will be described in terms of QAM modulation in which a particular data symbol is represented by a signal of a particular amplitude and a particular phase. The diagram shows, for example, a 16-point QAM constellation each point representing a particular amplitude and phase and having associated therewith a 4-bit data symbol. QAM is a 2-dimensional modulation. The system can be used with any modulation scheme, however, whether of 1, 2, 3, or more dimensions.

A first task of the signalling transition controller is to produce data describing a vector in signal space from a last data symbol to a next data symbol. For this purpose, the vector is resolved into a number of dimensions equal to the number of dimensions of the signal space. For a 2-dimensional signal space as in QAM, for example, the vector is resolved into two dimensions. Furthermore, in each dimension, the vector component is described in terms of an offset relative to a defined coordinate system, and a scale, or magnitude.

In FIG. 3A, therefore, data describing a vector in signal space from the last data symbol to the next data symbol is produced using two sets of look-up tables 10 and 20, one for each of the two dimensions (amplitude and phase) of QAM, each set of look-up tables including two look-up tables, a scale look-up table (12 and 14) and an offset look-up table (22 and 24), for a total of four look-up tables. Data symbols are input to a data symbol register including a last data register 26 and a next data register 28. Each data symbol includes n bits. The output of the next data register 28 is connected to the input of the last data register 26 and both data registers 26 and 28 are clocked by a data strobe such that each new data symbol is stored in the next data register 28 as the previous data symbol is being shifted over to the last data register 26.

The outputs of both data registers 26 and 28 are input to each of the scale look-up tables 12 and 22, since scale is a function of both the next data and the last data. Only the output of the last data register 26 is input to the offset look-up tables 14 and 24, however, since offset is a function of only the last data symbol. This may be better understood with reference to FIG. 6. If A represents a last data symbol and B represents a next data symbol in a two-dimensional signal space described by x and y axes, the x offset is the projection on the x axis of a vector from the origin to the last data symbol A and the y offset is the projection on the y axis of the same vector. The offsets are therefore a function of only the last data symbol. The x and y scales are the projections of a vector from the last data symbol A to the next data symbol B on the x and y axes, respectively. The x and y scales are therefore a function of both the last data symbol A and the next data symbol B. Preferably, the scale from A to B is traversed in k steps instead of in a single jump; the offset, however, is constant and is the point from which the k steps begin.

Referring again to FIG. 3A, the phase look-up tables 10 produce a phase scale that is input to a digital multiplier 30 and a phase offset that is input to a digital adder. Similarly, the amplitude look-up tables 20 produce and amplitude scale that is input to a digital multiplier 34 and an amplitude offset that is input to a digital adder 36. In the digital multipliers 30 and 34 the respective scales are multiplied by fractions progressively increasing from 0 to 1 with the offset being added to each product in the digital adders 32 and 36 to produce a series of phase and amplitude commands for the number controlled modulated oscillator. The progression of fractions is stored in shape look-up tables 38 and 40 and can be different for the phase and amplitude dimensions. A counter 42 is used to address the shape look-up tables 38 and 40.

The counter 42 is reset by the data strobe and is clocked by a signal that is a multiple k of the data strobe such that the counter counts from 0 to k-1 during each data symbol, causing each of the look-up tables 38 and 40 to output a sequence of k fractions by which the respective scales are multiplied. The respective offsets are then added to each product in the sequence to produce a sequence of phase commands $\phi$ and amplitude commands A for input to the number controlled modulated oscillator.

The commands $\phi$ and A can be further scaled by multipliers 44 and 46 according to a modulation scale factor. In this manner, normalized data can be stored in the look-up tables and can be subsequently de-normalized according to a specific application. The $\phi$ command is sent to a phase port of the number controlled modulated oscillator and the A command is sent to an amplitude port of the number controlled modulated oscillator.

As previously described, different shapes can be applied to different dimensional components of the signal transition, and these shapes can be made data-dependent. In other words, the shape of a transition from a data symbol 0001 to a data symbol 1110 can be different than the shape of a transition between another pair of data symbols, for example. This feature is shown in FIG. 3B, in which the shape of a transition between 0001 and 1110 is more curvilinear than an alternate shape illustrated as a straight line between another pair of data symbols. For this purpose, the contents of the last data register 26 and the next data register 28 can be input to the shape look-up tables 38 and 40 as illustrated by the dashed lines in addition to the output of the counter 42. Different shapes stored in the shape look-up tables 38 and 40 can then be selected between based on the last data symbol and the next data symbol.

The above-described system allows modulation to be performed in any coordinate system (e.g., polar coordinates or cartesian coordinates) which is the most convenient for a particular modulation scheme. For example, QAM is typically performed in cartesian coordinates. Applying the above-described transition controller to a conventional QAM modulator as shown in FIG. 4, an incoming data stream would be separated into x and y components in the transition controller 50. The x component would then be multiplied by a cosine carrier $\cos\omega_c$ using a mixer 52 and the y component would be multiplied by the corresponding sine carrier $\sin\omega_c$ using a mixer 54. The two resulting double side band, suppressed carrier amplitude modulated signals would then be added using an adder 56 to form a final QAM signal.

The same modulation may be performed more conveniently in polar coordinates, however, without the necessity of multiplying and adding signals, using a number controlled modulated oscillator as illustrated in FIG. 5A. Instead of cartesian components x and y, the transition controller 50 produces polar components r and $\theta$, related to the x and y components by the well-known relationships of FIG. 5B. The r and $\theta$ components can be input directly to the amplitude and phase modulation ports, respectively, of the NCMO 60 to produce a Polar Data Modulation (PDM) signal that is functionally equivalent in all respects to QAM.

FIG. 7A shows a data stream to be transmitted and FIG. 7B shows the signal state changes required to transmit the data according to quadrature frequency-shift keying QFSK modulation. The signal states are assumed to occur in the order 0 ($00_2$), 1 ($01_2$), 3 ($11_2$) and 2 ($10_2$) such that only a single bit changes between the symbols of successive states, although other orderings are also possible. A point midway between the states 1 and 3 will be assigned the value 0 for purpose of determining offsets. A first symbol pair to be placed in the symbol bucket is indicated as $\alpha$. The symbol 00 is placed in the last data register 26 and the symbol 10 is placed in the next data register 28 of FIG. 3A. Since only a single signal parameter, namely frequency, is being modulated, only one set of look-up-table memories would be used in conjunction with one shape look-up-table memory, for example look-up-table memories 10 and shape look-up-table memory 38.

Considering scale and offset with respect to the first data symbol pair $\alpha$, offset is a function solely of the last data symbol, in this case 00. Assuming arbitrarily that each state represents two units of offset, then the offset from the point of zero offset halfway between states 1 and 3 down to state 0 representing data symbol 00 is $-3$ units. The offset look-up-table memory 14 would therefore output $-3$ to the adder 32. Using the same units to determine scale, from state 0 representing the last data symbol 00 to state 2 representing the next data symbol 10 is $+6$ units. The scale look-up-table memory 12 therefore outputs $+6$ to the multiplier 30. Instead of transitioning immediately from state 0 to state 2 as indicated by the solid line, the contents of the shape look-up-table memory 38 will be applied in sequence to the calculated scale and offset to yield a more gradual transition as indicated by the dashed line.

The occurrence of a data strobe then results in what was previously the next data symbol 10 becoming the last data symbol and the succeeding data symbol 10 becoming the next data symbol. Since the next data symbol and the last data symbol are identical, the scale is 0 and only an offset of $+3$ is sent to the modulator. Later in the data transmission stream, a data symbol pair $\beta$ is placed in the symbol bucket with 11 as the last data symbol and 01 as the next data symbol. The offset at state 3 is $+1$, and the scale from state 3 to state 1 is $-2$. Once again, instead of an abrupt transition, the shape represented in the shape look-up-table 38 is applied to the offset and scale to result in a more gradual transition as represented by the dashed line. Operation proceeds in this fashion.

In practice, the signal transition controller is fully digital and, therefore, is readily integrable. Different shapes can be independently defined for each modulation dimension. The shape can also be made dependent on the data sequence itself. Performance of the signal transition controller is independent of baud rate and the type of modulation constellation. Increased data rates ca be accommodated by simply increasing the clock speed of the controller. Modulation can be performed in any convenient coordinate system, polar, cartesian or some other coordinate system. Finally, the signal transition controller is expandable to n dimensions where n is any integer.

It will be appreciated by those or ordinary skill in the art that the present invention can be embodied in other specific forms without departing from the spirit or essential character thereof. The presently disclosed embodiments ar therefore considered in all respects to be illustrative and not restrictive. The scope of the invention is indicated by the appended claims rather than the foregoing description, and all change which come within the meaning and range of equivalents thereof are intended to be embraced therein.

What is claimed is:

1. For use in a modulated signal communications system having a plurality of predefined signal states each representing a digital data symbol, a signal transition control system enabling a transition from one signal state to a next signal state to be executed in a smooth, bandwidth-efficient manner, comprising:

means for receiving a stream of data symbols to be data modulated and transmitted through a data telecommunications medium and storing in succession consecutive pairs of the data symbols, each of the pairs including a previous data symbol and a next data symbol, the means for receiving and storing comprising a pair of data registers connected in common to a data strobe signal, an input of a first one of the data registers being connected to receive the data stream, and an input of a second one of the data registers being connected to an output of the first one of the data registers;

first means, responsive to the means for receiving and storing, for producing data describing a vector in signal space from the previous data symbol to the next data symbol, the first means for producing comprising a plurality of look-up-table memories including a scale look-up-table memory and an offset look-up-table memory, an output of the second one of the data registers and the output of the first data register being used to address the scale look-up-table memory, and the output of the second data register being used to address the offset look-up-table memory;

means for storing data representative of a desired shape of a transition from the previous data symbol to the next data symbol;

means for sequentially stepping through the data representative of the desired shape to cause the data to be presented at an output of the means for storing; and second means, responsive to the first means for producing and to the means for storing, for producing data representing a transition from the previous data symbol to the next data symbol, the transition having the desired shape.

2. The system of claim 1 wherein the means for storing comprises a shape look-up-table memory.

3. The system of claim 2 wherein the means for sequentially stepping comprises a counter that is reset by the data strobe signal and is clocked by a signal that is a multiple k times the data strobe signal where k represents a number of data words stored in the means for storing and used to represent the desired shape, an output of the counter being used to address the means for storing.

4. The system of claim 3 wherein the second means for producing comprises a digital multiplier and a digital adder, the digital multiplier multiplying outputs of the scale look-up-table memory and the shape look-up-table memory and the digital adder adding outputs of the digital multiplier and the offset look-up-table memory.

5. The system of claim 4 wherein the output of the first data register and the output of the second data register are also used to address the means for storing, the desired shape being selected from a plurality of shapes depending on the previous data symbol and the next data symbol.

6. The system of claim 5 wherein a dimensional unit comprises a scale look-up-table memory, an offset look-up-table memory, a shape look-up-table memory, a digital multiplier and a digital adder, the scale look-up-table memory, the offset look-up-table memory, the shape look-up-table memory, the digital multiplier and the digital adder comprising a first dimensional unit, and wherein the signal space is two-dimensional, the system further comprising a second dimensional unit connected in common with the first dimensional unit to the means for receiving and storing and the means for sequentially stepping.

7. The system of claim 5 wherein a dimensional unit comprises a scale look-up-table memory, an offset look-up-table memory, a shape look-up-table memory, a digital multiplier and a digital adder, the scale look-up-table memory, the offset look-up-table memory, the shape look-up-table memory, the digital multiplier and the digital adder comprising a first dimensional unit and wherein the signal space is n-dimensional, the system further comprising n-1 dimensional units connected in common with the first dimensional unit to the means for receiving and storing and the means for sequentially stepping.

* * * * *